United States Patent
Saito et al.

(10) Patent No.: US 7,670,410 B2
(45) Date of Patent: Mar. 2, 2010

(54) CARBON-DIOXIDE-GAS ABSORBER, METHOD FOR SEPARATING CARBON-DIOXIDE-GAS USING CARBON-DIOXIDE-GAS ABSORBER, AND APPARATUS FOR SEPARATING CARBON-DIOXIDE-GAS INCLUDING CARBON-DIOXIDE-GAS ABSORBER

(75) Inventors: Yoshinori Saito, Otsu (JP); Yukio Sakabe, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 407 days.

(21) Appl. No.: 11/670,552

(22) Filed: Feb. 2, 2007

(65) Prior Publication Data
US 2007/0125229 A1 Jun. 7, 2007

Related U.S. Application Data

(63) Continuation of application No. PCT/JP2005/012420, filed on Jul. 5, 2005.

(30) Foreign Application Priority Data

| Aug. 3, 2004 | (JP) | 2004-227173 |
| Sep. 15, 2004 | (JP) | 2004-268848 |
| Dec. 1, 2004 | (JP) | 2004-348990 |

(51) Int. Cl.
*B01D 53/14* (2006.01)
*B01J 20/06* (2006.01)
*C01G 23/00* (2006.01)

(52) U.S. Cl. ............ 95/139; 423/230; 423/594.16; 423/637; 502/525

(58) Field of Classification Search ............ 96/108, 96/143, 153; 95/90, 139, 148, 900, 902; 423/220, 230, 594.16, 635–637, 598; 502/525
See application file for complete search history.

(56) References Cited

U.S. PATENT DOCUMENTS 4,829,033 A * 5/1989 Menashi et al. ............ 501/139

(Continued)

FOREIGN PATENT DOCUMENTS

JP 55-003104 A * 1/1980

(Continued)

OTHER PUBLICATIONS

Pfaff, G. "Synthesis and characterization of Ba2TiO4", Journal of Materials Science Letters, pp. 1059-1060, 1991.*

(Continued)

*Primary Examiner*—Frank M Lawrence
(74) *Attorney, Agent, or Firm*—Keating & Bennett, LLP

(57) ABSTRACT

A carbon-dioxide-gas absorber includes a main component of composite oxide, the composite oxide including Ti and X that is at least one of Sr and Ba, and the composite oxide having a molar ratio (X/Ti) of about 1.8 to about 2.2. A substance having a perovskite structure and an (X/Ti) of about 0.9 to about 1.1 or at least one selected from green sheets, green sheet wastes, green-sheet-laminate wastes, and precursors of green sheets including the substance is fired with at least one of strontium carbonate and barium carbonate. An apparatus includes a carbon-dioxide-gas-absorbing mechanical unit that allows a carbon-dioxide-gas absorber to absorb a carbon dioxide gas at about $1.0 \times 10^4$ to about $1.0 \times 10^6$ Pa and at about 500° C. to about 900° C.; and a carbon-dioxide-gas-evolving mechanical unit that evolves the absorbed carbon dioxide gas at about 1000 Pa or less and at at least about 750° C.

9 Claims, 9 Drawing Sheets

U.S. PATENT DOCUMENTS

| | | | |
|---|---|---|---|
| 6,387,845 | B1 | 5/2002 | Masahiro et al. |
| 6,482,387 | B1 * | 11/2002 | Gulgun et al. ............ 423/593.1 |
| 6,728,094 | B2 * | 4/2004 | Nakaya et al. ............ 361/321.2 |
| 2002/0179887 | A1 * | 12/2002 | Zeng et al. .................. 252/373 |
| 2004/0028601 | A1 * | 2/2004 | Torii et al. .................. 423/598 |

FOREIGN PATENT DOCUMENTS

| | | |
|---|---|---|
| JP | 5-103938 A | 4/1993 |
| JP | 05-293364 A | 11/1993 |
| JP | 8-71385 A | 3/1996 |
| JP | 10-272336 A | 10/1998 |
| JP | 2000-262890 A | 9/2000 |
| JP | 2001-219058 A | 8/2001 |
| JP | 2002-282685 A | 10/2002 |
| JP | 2004-85099 A | 3/2004 |

OTHER PUBLICATIONS

Official Communication for PCT Application No. PCT/JP2005/012420; mailed on Oct. 11, 2005.

Official communication issued in counterpart Chinese Application No. 200580026127, issued on Feb. 29, 2008.

Official communication issued in counterpart European Application No. 05765471.7, mailed on May 2, 2008.

Murata et al. "Differential Reaction Rate Determination of Barium Orthotitanate in Barium Titanate Powder," Analytical Chemistry; XP-002477173; vol. 47; No. 8; Jul. 1975; pp. 1467-1469.

Felgner et al.: "On the Formation of BaTiO3 From BaCO3 and TiO2 by Microwave and Conventional Heating," Materials Letters 58; XP-002477174; May 2004; pp. 1943-1947.

Hodjati et al.: "Absorption/Desporption of NOx Process on Perovskites: Performances to Remove NOx From a Lean Exhaust Gas," Applied Catalysis B: Environmental; vol. 26 XP-002477175; 2000; pp. 5-16.

Lin et al.: "Effects of Isovalent Substitutions on Lattice Softening and Transition Character of BaTiO3 Solid Solutions," Journal of Applied Physics; vol. 68; No. 3; Aug. 1, 1990; pp. 985-993.

\* cited by examiner

CARBON-DIOXIDE-GAS ABSORBER, METHOD FOR SEPARATING CARBON-DIOXIDE-GAS USING CARBON-DIOXIDE-GAS ABSORBER, AND APPARATUS FOR SEPARATING CARBON-DIOXIDE-GAS INCLUDING CARBON-DIOXIDE-GAS ABSORBER

BACKGROUND OF THE INVENTION

1. Field of the Invention

The present invention relates to a carbon-dioxide-gas absorber that absorbs a carbon dioxide gas at high temperatures, is regenerated by evolution of the absorbed carbon dioxide gas under predetermined conditions, and thus can be repeatedly used; a method for separating a carbon dioxide gas using the absorber; and an apparatus for separating a carbon dioxide gas including the absorber.

2. Description of the Related Art

Multilayer ceramic electronic components, such as multilayer ceramic capacitors, are typically produced by, for example, forming a ceramic slurry primarily including a dielectric material powder, such as barium titanate, into sheets, forming electrodes on the resulting ceramic green sheets (dielectric sheets) by printing, and stamping the sheets into required portions and laminating the resulting portions.

In some cases, unnecessary portions after stamping the ceramic green sheets are recovered and reused as a ceramic material. However, reuse is often limited because, for example, nonuniformity in dielectric properties of a dielectric material obtained after firing may occur due to a difference in particle size distribution after redispersion, and components of the electrode applied by printing and remaining on the ceramic green sheets may function as impurities to adversely affect the properties of the dielectric material.

Thus, waste products of titanate ceramic materials primarily including barium titanate are generated. A method for effectively reusing the waste products has been studied.

A carbon-dioxide-gas absorber including at least one selected from the group consisting of lithium silicates represented by the general formula $Li_xSi_yO_z$ is disclosed as a carbon-dioxide-gas absorber for use in separating a carbon dioxide gas ($CO_2$) at high temperatures, the gas being emitted from automobiles and energy plants using fuel primarily including hydrocarbons (see Japanese Unexamined Patent Application Publication No. 2000-262890 (Patent Document 1)). This carbon-dioxide-gas absorber is lightweight and acts as a carbon dioxide gas at temperatures above about 500° C.

However, the volume of lithium silicates changes substantially when lithium silicates absorb and evolve a carbon dioxide gas. Thus, stress caused by repeated use disadvantageously reduces the strength of the absorber. That is, a lithium silicate ($Li_4SiO_4$) has the effect of absorbing a carbon dioxide gas at high temperatures above 500° C. by reaction with a carbon dioxide gas as shown by chemical formula (1):

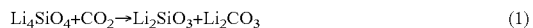

$$Li_4SiO_4 + CO_2 \rightarrow Li_2SiO_3 + Li_2CO_3 \qquad (1)$$

However, the absorption of a carbon dioxide gas by the lithium silicate increases the volume about 1.4 times. Thus, repeated absorption and evolution reduces strength, leading to deterioration of the lithium silicate. That is, the lithium silicate has a short service life.

SUMMARY OF THE INVENTION

To overcome the problems described above, preferred embodiments of the present invention provide a carbon-dioxide-gas absorber capable of absorbing a carbon dioxide gas at temperatures of at least about 500° C., having low expansion as the absorber absorbs a carbon dioxide gas, and having a satisfactory service life, a method for separating a carbon dioxide gas using the absorber, and an apparatus for separating a carbon dioxide gas including the absorber.

A carbon-dioxide-gas absorber according to a preferred embodiment of the present invention includes a composite oxide as a main component, the composite oxide including Ti and a constituent X that is at least one of Sr and Ba, and the composite oxide having an (X/Ti) of about 1.8 to about 2.2 on a molar basis.

The carbon-dioxide-gas absorber according to another preferred embodiment is prepared by firing a substance including Ti and the constituent X that is at least one of Sr and Ba in the presence of at least one of strontium carbonate and barium carbonate, the substance having an (X/Ti) of about 0.9 to about 1.1 on a molar basis and having a perovskite structure as a main crystalline structure.

The carbon-dioxide-gas absorber according to another preferred embodiment is prepared by firing at least one selected from green sheets, green sheet wastes, green-sheet-laminate wastes, and precursors of green sheets that have been used in a step of producing an electronic component and that primarily include substances each including Ti and the constituent X that is at least one of Sr and Ba, in the presence of at least one of strontium carbonate and barium carbonate, each of the substances having an (X/Ti) of about 0.9 to about 1.1 on a molar basis and having a perovskite structure as a main crystalline structure.

In the carbon-dioxide-gas absorber according to another preferred embodiment, the constituent X is partially replaced with Ca and has a molar ratio of Ca to X, i.e., (Ca/X), of about 1.0 or less.

The carbon-dioxide-gas absorber according to another preferred embodiment is prepared by firing the substance including Ca, Ti and the constituent X that is at least one of Sr and Ba in the presence of at least one of calcium carbonate, strontium carbonate, and barium carbonate, the substance having a perovskite structure as a main crystalline structure.

In the carbon-dioxide-gas absorber according to another preferred embodiment, Ti is partially replaced with Zr, and the molar ratio of Zr to Ti, i.e., (Zr/Ti), is about 0.25 or less.

The carbon-dioxide-gas absorber preferably has a specific surface area of at least about 0.25 m²/g.

The carbon-dioxide-gas absorber is preferably in the form of pellets and is prepared by forming green pellets and then firing the green pellets at about 1,000° C. to about 1,100° C.

A method for separating a carbon dioxide gas using the carbon-dioxide-gas absorber according to preferred embodiments of the present invention includes the steps of absorbing a carbon dioxide gas at a pressure of about 1.0×10⁴ Pa to about 1.0×10⁶ Pa and at a temperature of about 500° C. to about 900° C., and evolving a carbon dioxide gas absorbed in the carbon-dioxide-gas absorber at a pressure of about 1,000 Pa or less and at a temperature of at least about 750° C.

An apparatus for separating a carbon dioxide gas according to another preferred embodiment of the present invention includes a carbon-dioxide-gas-absorbing mechanical unit for bringing the carbon-dioxide-gas absorber according to any one of the preferred embodiments into contact with airflow including a carbon dioxide gas at a pressure of about 1.0×10⁴ Pa to about 1.0×10⁶ Pa and at a temperature of about 500° C. to about 900° C. to absorb the carbon dioxide gas, and a carbon-dioxide-gas-evolving mechanical unit for evolving a carbon dioxide gas by heating the carbon-dioxide-gas absorber that has absorbed the carbon dioxide gas by contact with the airflow containing the carbon dioxide gas at a reduced pressure of about 1,000 Pa or less and at a temperature of at least about 750° C.

The carbon-dioxide-gas absorber according to a preferred embodiment of the present invention primarily includes a composite oxide including Ti and a constituent X that is at least one of Sr and Ba, the composite oxide having an (X/Ti) of about 1.8 to about 2.2 on a molar basis. An example of the absorber is a material primarily including a compound represented by the general formula $Ba_2TiO_4$ or $Sr_2TiO_4$.

The carbon-dioxide-gas absorber may include an impurity, such as Mg, Si, Mn, Na, or Ni. The carbon-dioxide-gas absorber may further include a rare-earth element such as Dy as an impurity.

The carbon-dioxide-gas absorber, for example, $Ba_2TiO_4$, according to preferred embodiments of the present invention may be prepared by firing barium titanate ($BaTiO_3$) in the presence of barium carbonate ($BaCO_3$) to produce the reaction indicated by chemical formula (2):

$$BaTiO_3 + BaCO_3 \rightarrow Ba_2TiO_4 + CO_2\uparrow \quad (2)$$

The compound represented by $Ba_2TiO_4$ absorbs a carbon dioxide gas under specific conditions on the basis of the reaction indicated by chemical formula (3) described below to form $BaTiO_3$.

$$Ba_2TiO_4 + CO_2 \rightarrow BaTiO_3 + BaCO_3 \quad (3)$$

$BaTiO_3$ formed by absorbing the carbon dioxide gas is heated to a predetermined temperature or higher (at least about 750° C.) at a predetermined pressure (at a reduced pressure of about 1,000 Pa or less) to evolve a carbon dioxide gas and return to $Ba_2TiO_4$ according to the reaction represented by chemical formula (4):

$$BaTiO_3 + BaCO_3 \rightarrow Ba_2TiO_4 + CO_2\uparrow \quad (4)$$

That is, the carbon-dioxide-gas absorber absorbs and evolves a carbon dioxide gas on the basis of the reactions represented by chemical formulae (3) and (4).

Also in the case where strontium titanate ($SrTiO_3$) is used as a starting material, a compound represented by a general formula $Sr_2TiO_4$ useful as a carbon-dioxide-gas absorber can be prepared according to a reaction similar to the case of barium titanate ($BaTiO_3$).

The carbon-dioxide-gas absorber has the ability to absorb a carbon dioxide gas at high temperatures from about 500° C. to about 900° C. and at a pressure ranging from about $1.0 \times 10^4$ to about $1.0 \times 10^6$ Pa, in particular, at normal pressure.

The inventive carbon-dioxide-gas absorber that has absorbed the carbon dioxide gas evolves the carbon dioxide gas at a pressure of about 1,000 Pa or less and at a temperature of at least about 750° C. and is then regenerated into $Ba_2TiO_4$, $Sr_2TiO_4$, or other suitable compound. Thus, the inventive carbon-dioxide-gas absorber can repeatedly absorb a carbon dioxide gas. The carbon-dioxide-gas absorber has a volume expansion as low as about 10% when the absorber absorbs a carbon dioxide gas. Therefore, a stress due to repeated use is low, thus achieving a satisfactory service life.

The carbon-dioxide-gas absorber according to a preferred embodiment is prepared by firing a substance including Ti and the constituent X that is at least one of Sr and Ba in the presence of at least one of strontium carbonate and barium carbonate, the substance having an (X/Ti) of about 0.9 to about 1.1 on a molar basis and having a perovskite structure as a main crystalline structure. The absorber is easily and surely produced according to the reaction represented by chemical formula (2) described above. Thus, a material suitable for use as the inventive carbon-dioxide-gas absorber can be economically produced.

The inventive carbon-dioxide-gas absorber can be prepared by firing at least one selected from green sheets, green sheet wastes, green-sheet-laminate wastes, and precursors of green sheets that have been used in a step of producing an electronic component and that primarily include substances each including Ti and the constituent X that is at least one of Sr and Ba, in the presence of at least one of strontium carbonate and barium carbonate, each of the substances having an (X/Ti) of about 0.9 to about 1.1 on a molar basis and having a perovskite structure as a main crystalline structure.

The reaction represented by chemical formula (2) described below is produced by firing the substance (for example, $BaTiO_3$) including Ti and the constituent X that is at least one of Sr and Ba in the presence of at least one of strontium carbonate and barium carbonate, the substance having an (X/Ti) of about 0.9 to about 1.1 on a molar basis and having a perovskite structure as a main crystalline structure.

$$BaTiO_3 + BaCO_3 \rightarrow Ba_2TiO_4 + CO_2\uparrow \quad (2)$$

Also in the case where $SrTiO_3$ is used in place of $BaTiO_3$, a compound represented by a general formula $Sr_2TiO_4$ that is useful as a carbon-dioxide-gas absorber can be prepared according to a reaction similar to the case of $BaTiO_3$.

The compound (for example, $BaTiO_3$) having the perovskite structure may include an impurity, such as Mg, Si, Mn, Na, or Ni. The compound may further include a rare-earth element such as Dy as an impurity.

The term "green sheet" means a sheet into which a slurry including $BaTiO_3$ as a main component, a binder, and other suitable ingredients is formed. When the green sheet is formed in order to produce an electronic component and then becomes unnecessary, the green sheet can be used as a material for producing the carbon-dioxide-gas absorber according to preferred embodiments of the present invention.

The term "green sheet waste" means, for example, an unnecessary sheet after a required portion is removed from the above-described green sheet. The green sheet waste can be suitably used as a material for producing the carbon-dioxide-gas absorber according to preferred embodiments of the present invention.

The term "green-sheet-laminate waste" means, for example, the waste of a green laminate prepared by stacking and press-bonding the green sheets to which an electrode material is applied. The green-sheet-laminate waste can also be suitably used as a material for producing the carbon-dioxide-gas absorber according to preferred embodiments of the present invention.

The term "precursor of a green sheet" means, for example, a ceramic slurry including $BaTiO_3$ and a binder dispersed in a dispersant or $BaTiO_3$ to be dispersed in a dispersant. When the precursor of a green sheet is prepared but becomes unnecessary, the precursor of a green sheet can be used as a material for producing the carbon-dioxide-gas absorber according to preferred embodiments of the present invention.

In the carbon-dioxide-gas absorber according to preferred embodiments of the present invention, when the constituent X is partially replaced with Ca and has a molar ratio of Ca to X, i.e., (Ca/X), of about 1.0 or less, the resulting absorber can be effectively used as a carbon-dioxide-gas absorber. That is, the constituent X can be replaced with Ca in an amount of at most one-half of X on a molar basis.

A molar ratio of Ca to X, i.e., (Ca/X), exceeding about 1.0 undesirably increases the content of $Ca_3Ti_2O_7$ that does not substantially have the ability to absorb a carbon dioxide gas.

The value of the constituent X when the constituent X is partially replaced with Ca means the value of the constituent X before the constituent X is replaced with Ca. For example, where the molar ratio of the constituent X to Ti, i.e., (X/Ti), is about 1.8 to about 2.2, even when one-half of the constituent X on a molar basis is replaced with Ca, the molar ratio of the constituent X to Ti, i.e., (X/Ti), is regarded as about 1.8 to about 2.2.

In the carbon-dioxide-gas absorber prepared by firing the substance including Ca, Ti and the constituent X that is at least one of Sr and Ba in the presence of at least one of calcium carbonate, strontium carbonate, and barium carbonate, the substance has a perovskite structure as a main crystalline structure. Thereby, an effective material in which the constituent X is partially replaced with Ca and in which the molar ratio of Ca to the constituent X, i.e., (Ca/X), is about 1.0 or less can be obtained as a carbon-dioxide-gas absorber.

In the carbon-dioxide-gas absorber according to preferred embodiments of the present invention, where Ti in the composite oxide is partially replaced with Zr and the molar ratio of Zr to Ti, i.e., (Zr/Ti), is about 0.25 or less, the absorber can be effectively used as a carbon-dioxide-gas absorber.

A molar ratio of Zr to Ti, i.e., (Zr/Ti), exceeding about 0.25 undesirably increases the content of $Ba_2ZrO_4$ that evolves a carbon dioxide gas at higher temperatures.

In the carbon-dioxide-gas absorber according to preferred embodiments of the present invention, when the carbon-dioxide-gas absorber has a specific surface area of at least about 0.25 $m^2/g$, a high absorption coefficient of a carbon dioxide gas can be achieved. The occurrence of a crack due to expansion and shrinkage of the volume in response to the repeated absorption and evolution of a carbon dioxide gas can be prevented, thus improving a service life.

In the carbon-dioxide-gas absorber according to preferred embodiments of the present invention, when the specific surface area is about 0.25 $m^2/g$, the porosity is about 20%. Since the carbon-dioxide-gas absorber according to preferred embodiments of the present invention has no regular shape, quantification is performed in terms of the specific surface area rather than the porosity. This is useful to the production of a carbon-dioxide-gas absorber having stable properties.

In the carbon-dioxide-gas absorber according to preferred embodiments of the present invention, the carbon-dioxide-gas absorber in the form of pellets is produced by forming green pellets and then firing the green pellets at about 1,000° C. to about 1,100° C. In this case, even when the absorber is in the form of pellets each having a size of several millimeters, a carbon-dioxide-gas absorber having a high ability to absorb a carbon dioxide gas, having satisfactory stability, and having a satisfactory service life can be provided at low cost.

The carbon-dioxide-gas absorber having the requirement, i.e., having a specific surface area of at least about 0.25 $m^2/g$, has an improved ability to absorb a carbon dioxide gas.

The carbon-dioxide-gas absorber according to preferred embodiments of the present invention is thermally stable compared with, for example, a lithium silicate carbon-dioxide-gas absorber. In some cases, the absorption coefficient varies according to a sintered state thereof.

Where the absorber is in the form of a powder, even when the absorber is fired at a temperature exceeding about 1,100° C., no degradation in absorption properties is observed. However, where the absorber is in the form of pellets, when the absorber is fired at a temperature exceeding about 1,100° C., the resulting carbon-dioxide-gas absorber has higher sintered density. This may reduce the absorption coefficient or cause the occurrence of a crack during the absorption of a carbon dioxide gas.

However, for the absorber in the form of pellets fired at a temperature exceeding about 1,100° C., when the pellets are pulverized and used as a powdery absorber, no reduction in absorption coefficient is observed.

The absorber may have a gap therein and a specific surface area of at least about 0.25 $m^2/g$ by performing firing at a temperature of about 1,000° C. to about 1,100° C. Furthermore, the occurrence of a crack due to the volume expansion and shrinkage in response to the absorption and evolution of a carbon dioxide gas can be prevented to improve a service life.

The method for separating a carbon dioxide gas according to preferred embodiments using the carbon-dioxide-gas absorber according to preferred embodiments includes the steps of absorbing a carbon dioxide gas at a pressure of about $1.0 \times 10^4$ to about $1.0 \times 10^6$ Pa and at a temperature of about 500° C. to about 900° C., and evolving the carbon dioxide gas absorbed in the carbon-dioxide-gas absorber at a pressure of about 1,000 Pa or less and at a temperature of at least about 750° C. It is possible to efficiently absorb a carbon dioxide gas at high temperatures and evolve the absorbed carbon dioxide gas (regeneration of the carbon-dioxide-gas absorber). The use of this method results in efficient, economical separation of a carbon dioxide gas at high temperatures.

According to the inventive method for separating a carbon dioxide gas, since the evolution (desorption) of the carbon dioxide gas is performed at a reduced pressure of about 1,000 Pa or less, carbon dioxide gas having high concentration is recovered.

The apparatus for separating a carbon dioxide gas according to preferred embodiments of the present invention includes a carbon-dioxide-gas-absorbing mechanical unit for bringing the carbon-dioxide-gas absorber into contact with airflow including a carbon dioxide gas at a pressure of about $1.0 \times 10^4$ Pa to about $1.0 \times 10^6$ Pa and at a temperature of about 500° C. to about 900° C. to absorb the carbon dioxide gas, and a carbon-dioxide-gas-evolving mechanical unit for evolving a carbon dioxide gas by heating the carbon-dioxide-gas absorber that has absorbed the carbon dioxide gas by contact with the airflow including the carbon dioxide gas at a reduced pressure of about 1,000 Pa or less and at a temperature of at least about 750° C. The absorption of a carbon dioxide gas can be performed at high temperatures in the carbon-dioxide-gas-absorbing mechanical unit. The evolution of the absorbed carbon dioxide gas (regeneration of the carbon-dioxide-gas absorber) can be performed in the carbon-dioxide-gas-evolving mechanical unit. Thus, the use of the apparatus for separating a carbon dioxide gas produces efficient, economical separation of a carbon dioxide gas at high temperatures.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Advantages of the present invention will now be described with reference to preferred embodiments.

First Preferred Embodiment

Production of First Carbon-Dioxide-Gas Absorber $BaCO_3$ was added to a $BaTiO_3$ powder such that the molar ratio of $BaTiO_3$ to $BaCO_3$ was about 1/1. Water was added thereto. The resulting mixture was mixed for about 2 hours with a ball mill.

The mixture was dried at about 120° C. for about 10 hours. The resulting powder was fired at about 1,200° C. for about 2 hours to form a carbon-dioxide-gas absorber (ceramic powder) primarily including $Ba_2TiO_4$.

Production of Second Carbon-Dioxide-Gas Absorber

An unnecessary portion (unnecessary green sheet) obtained after the removal of a necessary portion from a green sheet primarily including a compound ($BaTiO_3$) including Ba and Ti at a molar ratio of Ba to Ti, i.e., (Ba/Ti), of about 0.99 to about 1.01 and having a perovskite structure as a main crystalline structure, the green sheet being used for the production of a multilayer ceramic capacitor, was calcined at about 500° C. to form a ceramic powder having a about $BaTiO_3$ content of about 87%.

The remainder of the resulting ceramic powder primarily includes oxides of Ca, Zr, Si, and Na.

Similar to the method for producing the first carbon-dioxide-gas absorber, $BaCO_3$ was added to the resulting ceramic powder such that the molar ratio of $BaTiO_3$ to $BaCO_3$ was about 1/1. Water was added thereto. The resulting mixture was mixed for about 2 hours with a ball mill.

The mixture was dried at about 120° C. for about 10 hours. The resulting powder was fired at about 1,200° C. for about 2 hours to form a carbon-dioxide-gas absorber (ceramic powder) primarily including $Ba_2TiO_4$.

Figure 1:
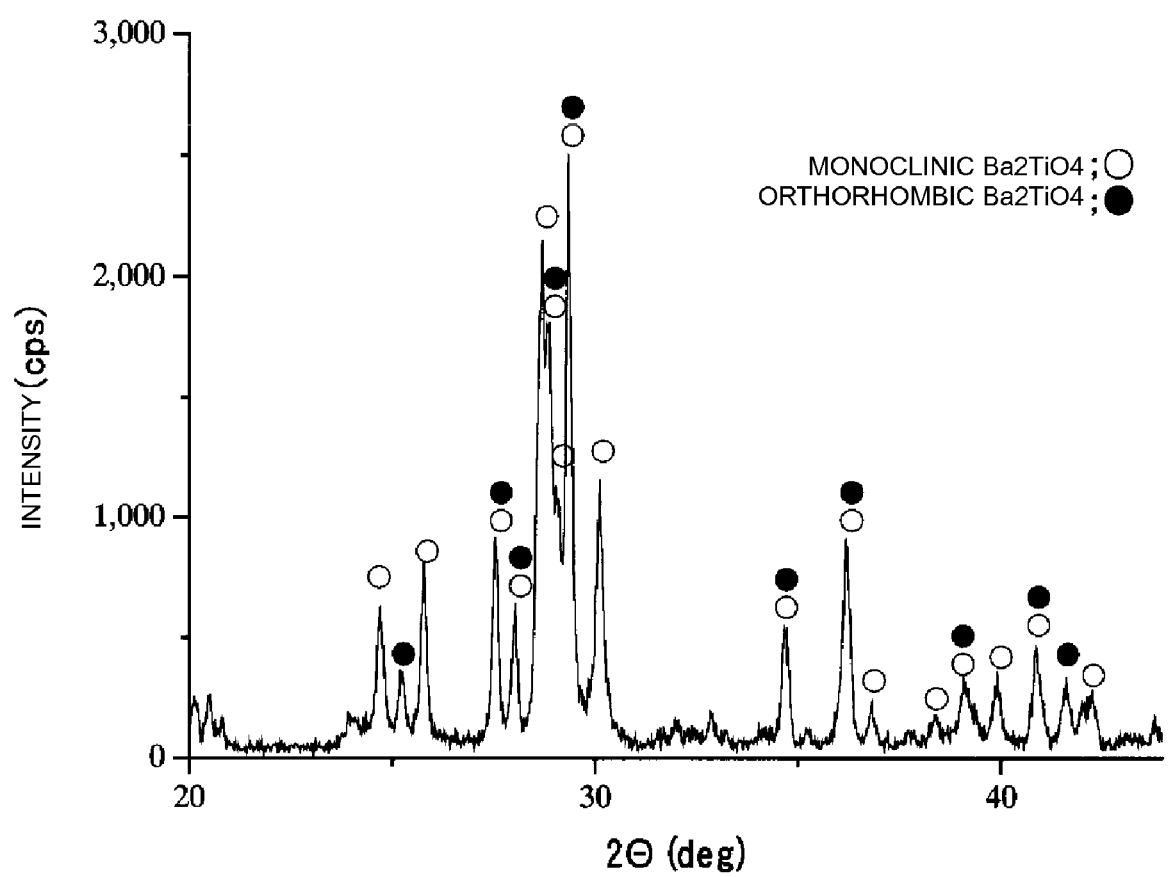
FIG. 1 is a chart showing the results of the study of the crystalline phase of a carbon-dioxide-gas absorber according to a first preferred embodiment of the present invention.

The crystalline phase of the carbon-dioxide-gas absorber was examined by X-ray diffraction analysis. FIG. 1 shows the results.

As shown in FIG. 1, the carbon-dioxide-gas absorber has monoclinic $Ba_2TiO_4$ and orthorhombic $Ba_2TiO_4$. The X-ray diffraction chart in FIG. 1 demonstrates that the proportion of monoclinic $Ba_2TiO_4$ is slightly greater than the proportion of orthorhombic $Ba_2TiO_4$.

It is verified that properties of monoclinic $Ba_2TiO_4$ are not markedly different from properties of orthorhombic $Ba_2TiO_4$, and there is no significant difference in properties as a carbon-dioxide-gas absorber.

Measurement of Properties

Figure 2:
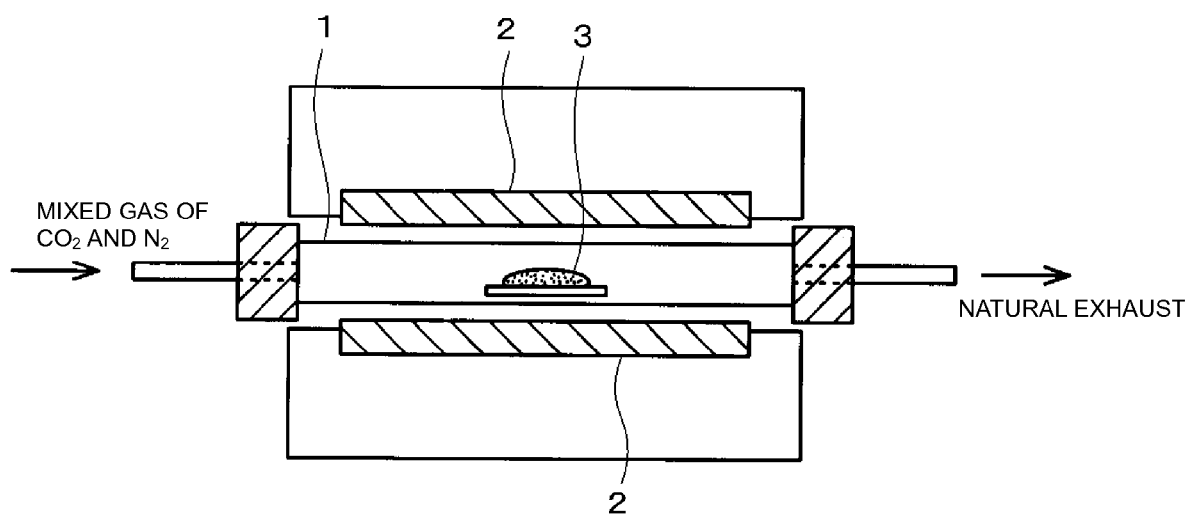
FIG. 2 shows a test unit for examining the carbon-dioxide-gas-absorbing ability (the rate of reaction with a carbon dioxide gas) of the carbon-dioxide-gas absorber according to the first preferred embodiment of the present invention.

With respect to the first carbon-dioxide-gas absorber and the second carbon-dioxide-gas absorber, the carbon-dioxide-gas-absorbing ability was examined with a test unit shown in FIG. 2, and the carbon-dioxide-gas-evolving properties of the carbon-dioxide-gas absorbers after the absorption of a carbon dioxide gas were examined.

The test unit shown in FIG. 2 uses a tubular furnace. The test unit includes a gas absorption tube 1 into which a mixed gas of a carbon dioxide gas ($CO_2$) and a nitrogen gas ($N_2$) is fed, and a heater 2 disposed at the periphery of the gas absorption tube 1 to heat the inside of the gas absorption tube 1. The temperature of the inside of the gas absorption tube 1 can be controlled between room temperature to about 1,300° C.

Then, about 1.5 g of a carbon-dioxide-gas absorber 3 was placed at the middle portion in the gas absorption tube 1 of the test unit. The mixed gas of the carbon dioxide gas and the nitrogen gas was fed at a rate of about 500 mL per minute while the inside of the gas absorption tube 1 was heated to a predetermined temperature with the heater 2 to examine a change in the weight of the carbon-dioxide-gas absorber (behavior of the absorption of the carbon dioxide gas).

From the resulting change in the weight of the carbon-dioxide-gas absorber, the rate of the reaction of the carbon-dioxide-gas absorber and the carbon dioxide gas was calculated with formula (a):

Rate of reaction=amount of $CO_2$ adsorbed (mol %)/$Ba_2TiO_4$ content (mol %) (a)

Figure 3:
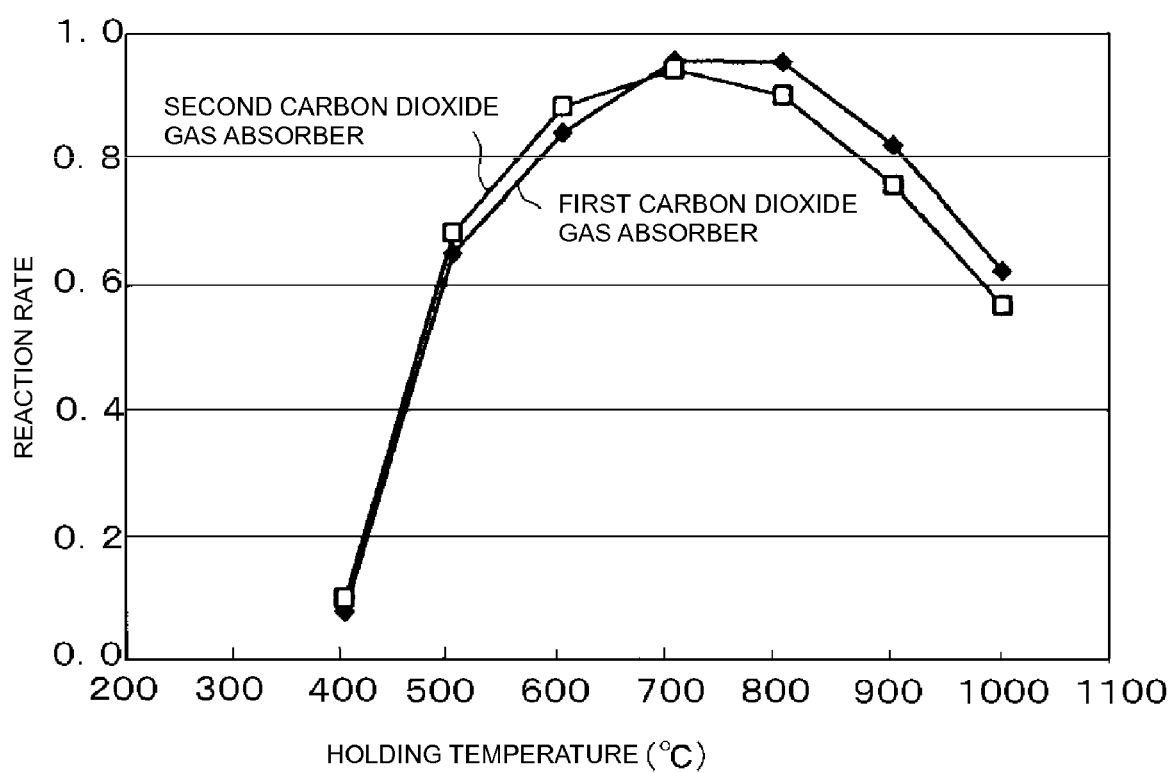
FIG. 3 is a graph showing the relationship between the temperature and the carbon-dioxide-gas-absorbing ability (the rate of reaction with a carbon dioxide gas) of the carbon-dioxide-gas absorber according to the first preferred embodiment of the present invention.

FIG. 3 shows the results. As shown in FIG. 3, the results demonstrated that in each of the first carbon-dioxide-gas absorber and the second carbon-dioxide-gas absorber, the absorption of the carbon dioxide gas initiated at about 500° C., the absorption peak was observed at about 700° C., and each absorber exhibited a competitive absorption ability up to about 900° C.

The results demonstrated that the first and second carbon-dioxide-gas absorbers had the carbon-dioxide-gas-absorbing ability at temperatures between about 500° C. and about 900° C. In other words, the first and second carbon-dioxide-gas absorbers were suitable for use as carbon-dioxide-gas absorbers.

Furthermore, with respect to the carbon-dioxide-gas absorber that had absorbed the carbon dioxide gas, the carbon-dioxide-gas-evolving properties was examined by a method described below.

Figure 4:
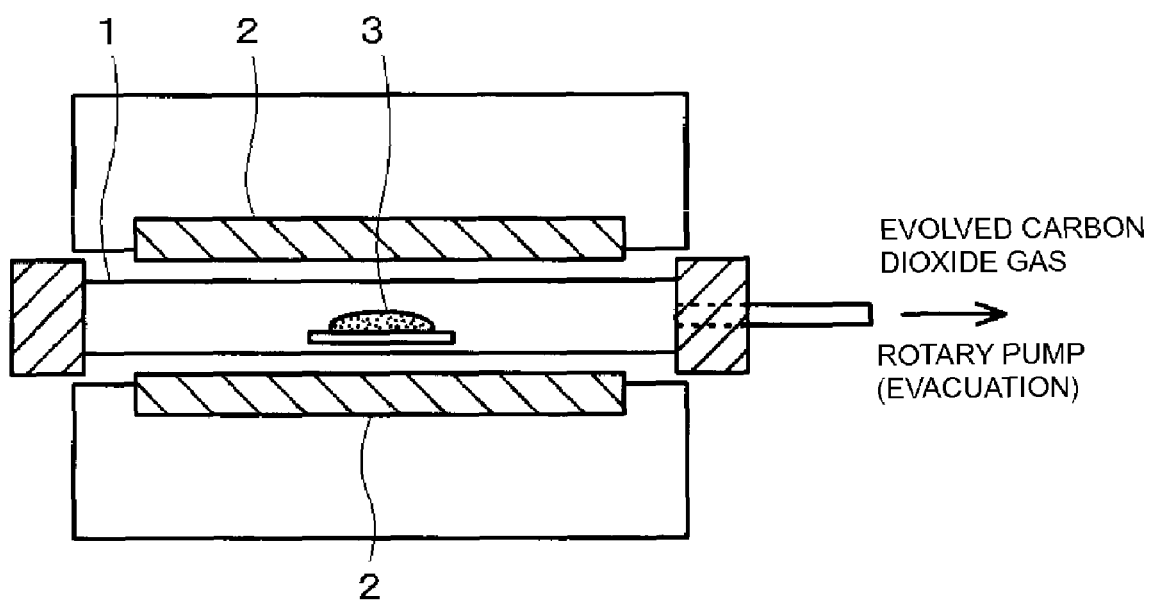
FIG. 4 shows a test unit for examining the carbon-dioxide-gas-evolving ability (the evolution rate of a carbon dioxide gas) of the carbon-dioxide-gas absorber according to the first preferred embodiment of the present invention.
Figure 5:
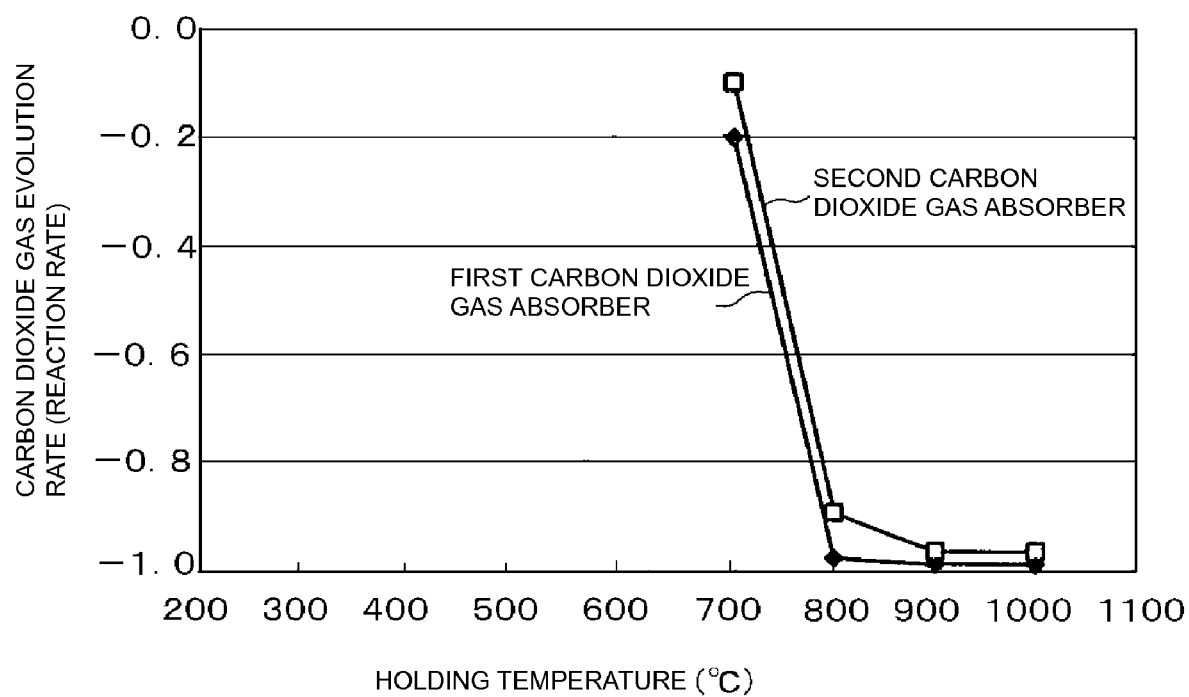
FIG. 5 is a graph showing the relationship between the temperature and the carbon-dioxide-gas-evolving ability (the evolution rate of a carbon dioxide gas) of the carbon-dioxide-gas absorber according to the first preferred embodiment of the present invention.

As described above, the carbon-dioxide-gas absorber 3 was placed at the middle portion in the gas absorption tube 1. The mixed gas of the carbon dioxide gas and the nitrogen gas was fed at a rate of about 500 mL per minute while the inside of the gas absorption tube 1 was heated to a predetermined temperature with the heater 2. Then, the feed of the carbon dioxide gas was stopped. As shown in FIG. 4, the inlet side of the gas absorption tube 1 was closed, and a change in the weight of the carbon-dioxide-gas absorber 3 (behavior of the evolution of the carbon dioxide gas) was examined while the tube was evacuated with a rotary pump from the outlet side such that a predetermined degree of vacuum (about 100 Pa in this preferred embodiment) was achieved. The rate of the evolution of the carbon dioxide gas was determined from the amount of the reduction in the weight of the carbon-dioxide-gas absorber 3. FIG. 5 shows the results.

The rate of the evolution of the carbon dioxide gas (rate of reaction) in FIG. 5 was determined on the basis of formula (a) described above. That is, this is based on a concept that when the rate of reaction in the absorption of the carbon dioxide gas is determined to be 1.0 with formula (a), the carbon dioxide gas evolution rate (reaction rate) in FIG. 5 is 0, and when all of the carbon dioxide gas absorbed is evolved (the rate of reaction in the absorption of the carbon dioxide gas is 0), the evolution rate (reaction rate) in FIG. 5 is −1.0.

As shown in FIG. 5, the results demonstrated that for the evolution of the carbon dioxide gas, the first and second carbon-dioxide-gas absorbers indicated a similar tendency, and the carbon dioxide gas was efficiently evolved at a temperature of about 750° C. or higher. In this test, the carbon-dioxide-gas-evolution properties were examined at a pressure of about 100 Pa. It is verified that the evolution (desorption) of the carbon dioxide gas is efficiently performed at a reduced pressure of about 1,000 Pa or less.

Furthermore, according to preferred embodiments of the present invention, since the evolution (desorption) of the carbon dioxide gas is performed at a reduced pressure of about 1,000 Pa or less, the carbon dioxide gas having high concentration is recovered.

In the first preferred embodiment 1, the production of the carbon-dioxide-gas absorber from $BaTiO_3$ powder and the unnecessary green sheet as starting materials has been described as an example. According to various preferred embodiments of the present invention, for example, a green sheet into which a slurry including $BaTiO_3$ as a main component, a binder, and other suitable ingredients is formed, a green sheet to which a conductive paste is applied, and the precursor of a green sheet (for example, a ceramic slurry containing $BaTiO_3$ with a binder dispersed in a dispersant or $BaTiO_3$ before dispersing thereof in a dispersant) may also be used as starting materials. Also in this case, it is possible to obtain similar effects to the first preferred embodiment.

Second Preferred Embodiment

Starting materials, i.e., $BaTiO_3$, $SrTiO_3$, $CaTiO_3$, $BaCO_3$, $SrCO_3$, $CaCO_3$, and $BaZrO_3$ were blended at the composition on a molar basis shown in Table 1. The resulting mixture was mixed for about 2 hours with a ball mill.

TABLE 1

| sample | $BaTiO_3$ | $SrTiO_3$ | $CaTiO_3$ | $BaCO_3$ | $SrCO_3$ | $CaCO_3$ | $BaZrO_3$ |
|---|---|---|---|---|---|---|---|
| 1 | — | 1.0 | — | — | 1.0 | — | — |
| 2 | 1.0 | — | — | — | 1.0 | — | — |
| 3 | 1.0 | — | — | 0.5 | 0.5 | — | — |
| 4 | 1.0 | — | — | — | — | 1.0 | — |
| 5 | 1.0 | — | — | 0.5 | — | 0.5 | — |
| 6 | 1.0 | — | — | 0.9 | — | 0.1 | — |
| 7 | — | 1.0 | — | 1.0 | — | — | — |
| 8 | — | — | 1.0 | 1.0 | — | — | — |
| 9 | 1.0 | — | — | 0.5 | 0.25 | 0.25 | — |
| 10 | 0.8 | — | — | 1.0 | — | — | 0.2 |
| A | 1.0 | — | — | 1.0 | — | — | — |

The resulting mixture was dried at about 120° C. for about 10 hours. The resulting powder was fired at about 1,200° C. for about 2 hours to form a composite oxide powder (carbon-dioxide-gas absorber (ceramic powder)).

TG-DTA analysis (thermogravimetric analysis-differential thermal analysis) of the resulting composite oxide was performed in a mixed gas atmosphere including $CO_2$ and $N_2$ with the $CO_2$ to $N_2$ ratio of about 20:80 on a volume basis.

TG-DTA analysis (thermogravimetric analysis-differential thermal analysis) of the first carbon-dioxide-gas absorber, in the first preferred embodiment was performed under the same conditions (the first carbon-dioxide-gas absorber being a carbon-dioxide-gas absorber mainly composed of $Ba_2TiO_4$ produced by adding $BaCO_3$ to the $BaTiO_3$ powder in such a manner that the molar ratio of $BaTiO_3$ to $BaCO_3$ is 1/1; mixing the mixture; and firing the resulting mixture at about 1,200° C. for about 2 hours).

Figure 6:
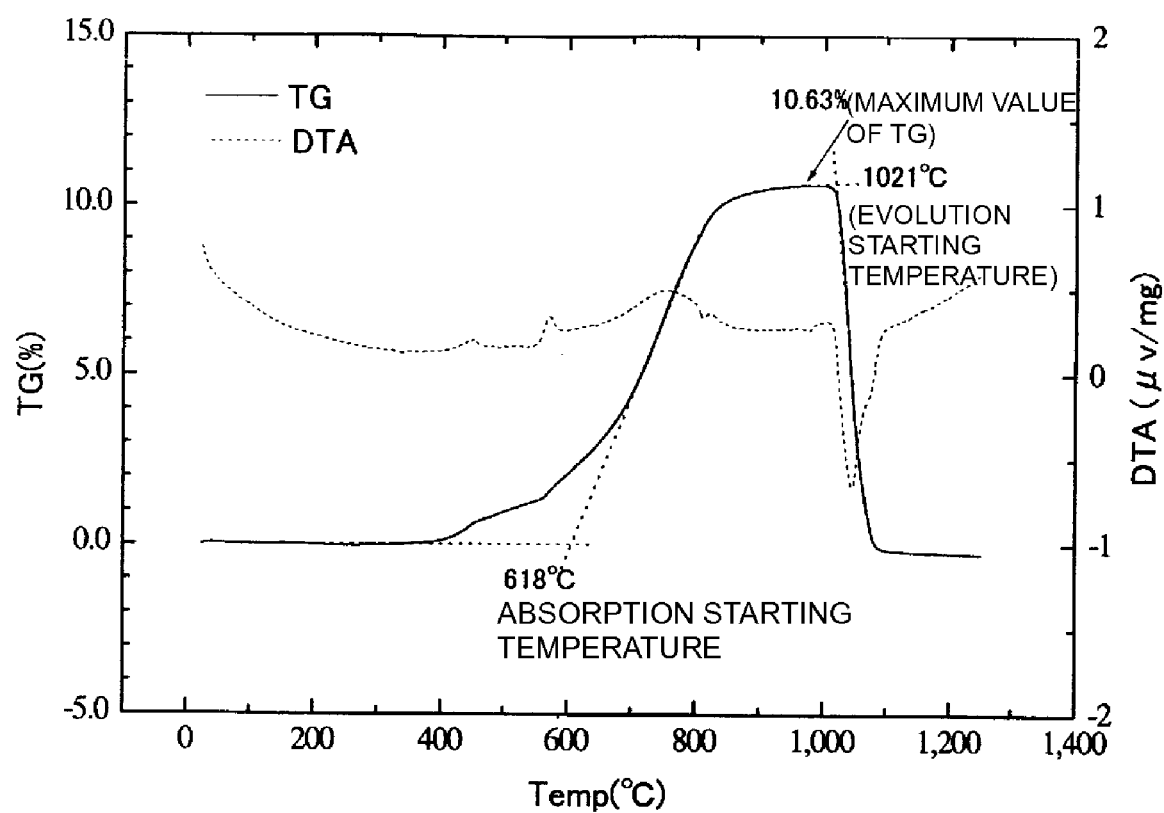
FIG. 6 is a chart showing the results of the TG-DTA analysis of a first carbon-dioxide-gas absorber in the first preferred embodiment.

FIG. 6 shows the results of TG-DTA analysis of the first carbon-dioxide-gas absorber in the first preferred embodiment 1.

As shown in FIG. 6, the weight of the first carbon-dioxide-gas absorber in the first preferred embodiment 1 (sample A shown in Tables 1 and 2) in the gas atmosphere containing $CO_2$ and $N_2$ with the $CO_2$ to $N_2$ ratio of about 20:80 on a volume basis increased from about 618° C. due to the absorption of a carbon dioxide gas. The weight decreased at least about 1,021° C. due to the evolution of a carbon dioxide gas to return to the initial weight. The maximum volume of TG refers to the maximum amount of the absorption of a carbon dioxide gas.

Thus, in the case where a substance can be effectively used as a carbon-dioxide-gas absorber, a change in weight due to absorption and evolution of a carbon dioxide gas can be checked using this method.

Table 2 shows the absorption starting temperature of a carbon dioxide gas, the evolution starting temperature of a carbon dioxide gas, and the maximum amount of a carbon dioxide gas absorbed (maximum value of TG) from the results of TG-DTA analysis of the composite oxides (samples 1 to 10) produced by the method described in second preferred embodiment 2 and the first carbon-dioxide-gas absorber (sample A in Tables 1 and 2).

TABLE 2

| sample | Absorption starting temperature of carbon dioxide gas (° C.) | Evolution starting temperature of carbon dioxide gas (° C.) | Maximum value of TG (%) |
|---|---|---|---|
| 1 | 669 | 1045 | 12.9 |
| 2 | 629 | 1088 | 12.3 |
| 3 | 638 | 1050 | 11.6 |
| 4 | 598 | 920 | 7.0 |
| 5 | 488 | 933 | 8.4 |
| 6 | 498 | 999 | 10.4 |
| 7 | 643 | 1056 | 12.4 |
| 8 | 601 | 922 | 7.2 |
| 9 | 512 | 1052 | 12.4 |
| 10 | 610 | 1036 | 9.5 |
| A | 608 | 1021 | 10.6 |

Table 2 shows that although the sample-to-sample variation in the absorption starting temperature of a carbon dioxide gas, the evolution starting temperature of a carbon dioxide gas, and the maximum amount of a carbon dioxide gas absorbed of the samples are recognized, the maximum amount of a carbon dioxide gas absorbed (maximum value of TG) of any of these samples is substantially increased, and thus, all of the samples can be used as a carbon-dioxide-gas absorber.

Furthermore, Table 2 shows that when Sr is included, the evolution starting temperature shifts to higher temperatures, and the maximum value to TG increases.

It is found that when Ca is also included such that the ratio of Ca to the constituent X that is at least one of Sr and Ba, i.e., (Ca/X), is about 1.0 or less, the maximum value of TG decreases, and the evolution starting temperature shifts to lower temperatures, thus further facilitating the recovery of the carbon dioxide gas.

In a low Ca content region, the maximum values of TG do not differ substantially, and the absorption starting temperature decreases, thus improving the absorption efficiency at low temperatures.

The substance, in which Ti is partially replaced with Zr, such as sample 10, can also be used as a carbon-dioxide-gas absorber.

In each sample shown in Table 2, treatment at a high temperature of at least about 900° C. is required. However, the carbon-dioxide-gas-evolving temperature can be reduced by depressurizing the reaction system.

In the above-described example, the production of the carbon-dioxide-gas absorber from the $BaTiO_3$ powder, $SrTiO_3$ powder, and $CaTiO_3$ powder has been described as an example. According to various preferred embodiments of the present invention, for example, a ceramic green sheet into which a slurry including $BaTiO_3$, $SrTiO_3$, $CaTiO_3$ or other suitable compound and a binder is formed, a ceramic green sheet to which a conductive paste is applied, a green laminate waste prepared by laminating green sheets, and the precursor of a green sheet (for example, a ceramic slurry including $BaTiO_3$, $SrTiO_3$, $CaTiO_3$, or other suitable compound with a binder dispersed in a dispersant or $BaTiO_3$, $SrTiO_3$, $CaTiO_3$, or other suitable compound before dispersing thereof in a dispersant) may also be used as starting materials. When these materials are used, an impurity, such as Mg, Si, Mn, Na, or Ni, or a rare-earth element such as Dy is included as an impurity. It is verified that similar effects to the samples in Table 2 are obtained.

Third Preferred Embodiment

Figure 7:
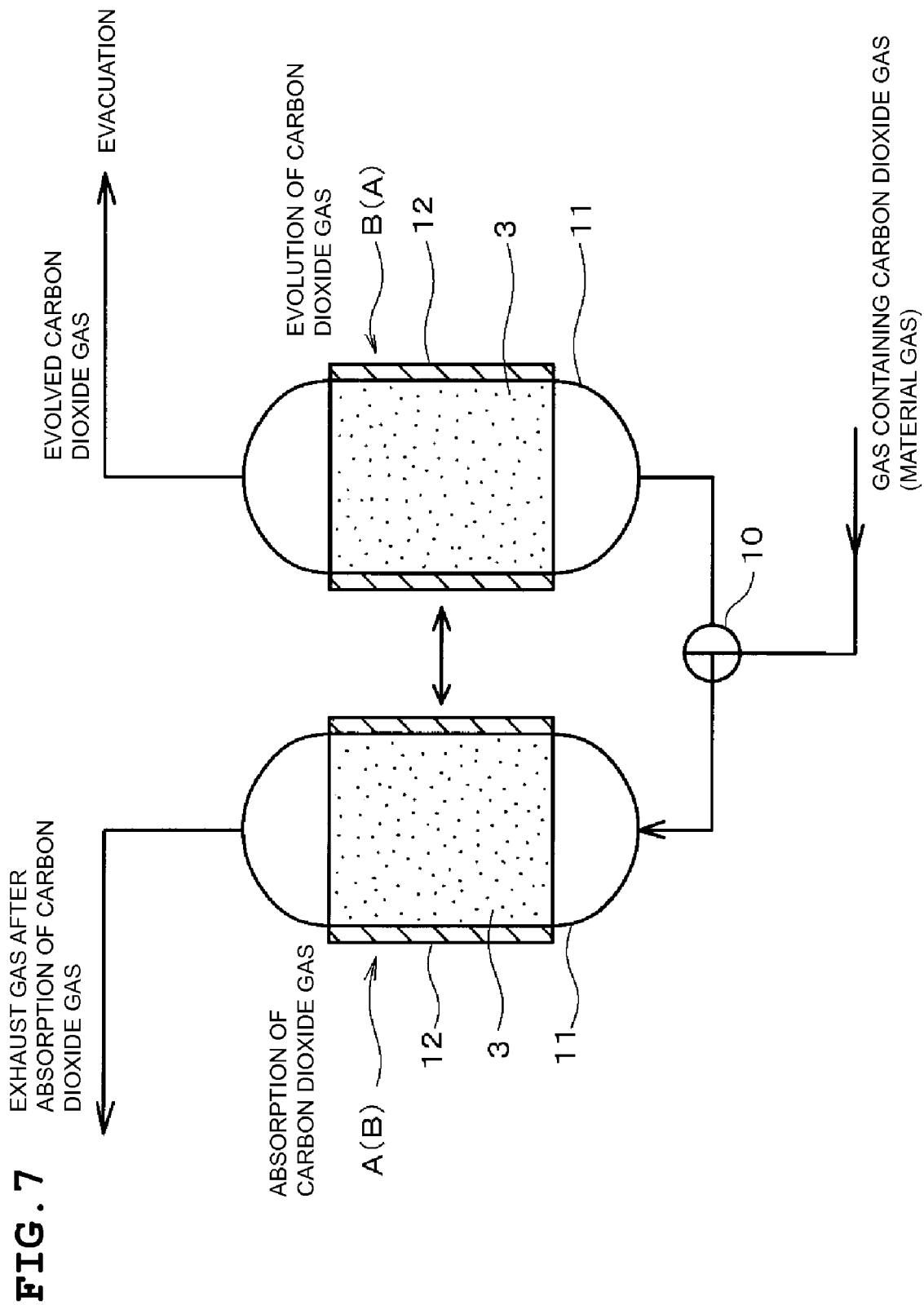
FIG. 7 shows a schematic structure of an apparatus for separating a carbon dioxide gas according to a third preferred embodiment of the present invention.

FIG. 7 shows a schematic structure of an apparatus for separating a carbon dioxide gas according to another preferred embodiment of the present invention.

In the apparatus for separating a carbon dioxide gas, after the carbon-dioxide-gas absorber according to preferred embodiments of the present invention absorbs and separates a carbon dioxide gas in an exhaust combustion gas (gas containing a carbon dioxide gas), a carbon dioxide gas is evolved and recovered from the carbon-dioxide-gas absorber that has absorbed a carbon dioxide gas. The apparatus includes a selector valve 10 for changing the flow of the exhaust combustion gas, carbon-dioxide-gas-absorbing mechanical unit, and two mechanical units A and B function as the carbon-dioxide-gas-absorbing mechanical unit and the carbon-dioxide-gas-evolving mechanical unit.

FIG. 7 shows a state in which a carbon dioxide gas-containing gas (material gas) is fed to the left mechanical unit A with the selector valve 10. FIG. 7 shows a state in which the left mechanical unit A functions as the carbon-dioxide-gas-absorbing mechanical unit, and the right mechanical unit B functions as the carbon-dioxide-gas-evolving mechanical unit that evolves a carbon dioxide gas.

Each of the mechanical units A and B includes a tank 11, a heater 12, and the inventive carbon-dioxide-gas absorber 3 (the carbon-dioxide-gas absorber according to the first preferred embodiment) charged in the tank 11.

As shown in FIG. 7, the selector valve 10 is set such that the exhaust combustion gas is fed to the left mechanical unit A. In this state, the exhaust combustion gas (in the third preferred embodiment, pressure: normal, temperature: about 700° C., and carbon dioxide gas ($CO_2$) content: 20 vol %) is fed. Thereby, the mechanical unit A (carbon-dioxide-gas-absorbing mechanical unit) absorbs a carbon dioxide gas.

With respect to the mechanical unit B (carbon-dioxide-gas-evolving mechanical unit), the tank 11 is evacuated from the exit side to reduce the pressure to about 1,000 Pa or less (for example, 100 Pa). The carbon-dioxide-gas absorber 3 that has absorbed a carbon dioxide gas in the tank 11 is heated with the heater 12 to about 850° C. to evolve a carbon dioxide gas from the carbon-dioxide-gas absorber 3. Thereby, the evolved carbon dioxide gas is recovered at a high concentration, and the carbon-dioxide-gas absorber 3 that has absorbed the carbon dioxide gas is regenerated, and then the regenerated absorber is reused.

The absorption reaction represented by chemical formula (3) of a carbon dioxide gas with the carbon-dioxide-gas absorber in the apparatus for separating a carbon dioxide gas is as follows:

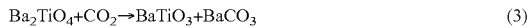

$$Ba_2TiO_4 + CO_2 \rightarrow BaTiO_3 + BaCO_3 \qquad (3)$$

The evolution reaction represented by chemical formula (4) of a carbon dioxide gas from the carbon-dioxide-gas absorber that has absorbed a carbon dioxide gas is as follow:

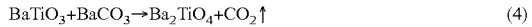

$$BaTiO_3 + BaCO_3 \rightarrow Ba_2TiO_4 + CO_2\uparrow \qquad (4)$$

When the carbon-dioxide-gas-absorbing ability of the carbon-dioxide-gas absorber 3 charged in the mechanical unit A (carbon-dioxide-gas-absorbing mechanical unit) is degraded, the selector valve 10 is switched such that the exhaust combustion gas is fed to the right mechanical unit B. Thereby, the exhaust combustion gas is fed to the mechanical unit B. The carbon-dioxide-gas absorber 3 charged in the mechanical unit B (carbon-dioxide-gas-absorbing mechanical unit) absorbs a carbon dioxide gas.

In the mechanical unit A, the tank 11 is evacuated from the exit side to reduce the pressure to about 1,000 Pa or less (for example, about 100 Pa). The carbon-dioxide-gas absorber 3 that has absorbed the carbon dioxide gas in the tank 11 is heated to about 850° C. with the heater 12 to evolve the carbon dioxide gas from the carbon-dioxide-gas absorber 3. Thereby, the evolved carbon dioxide gas is recovered, and the carbon-dioxide-gas absorber 3 that has absorbed the carbon dioxide gas is regenerated.

The repetition of this allows the apparatus to stably separate and recover the carbon dioxide gas over long periods of time.

Where the mechanical unit A and the mechanical unit B are alternately switched to the carbon-dioxide-gas-absorbing mechanical unit and the carbon-dioxide-gas-evolving mechanical unit, paths of flow of gases emitted from the mechanical unit A and the mechanical unit B can be easily switched with the selector valve.

In the third preferred embodiment, the weight and volume of the carbon-dioxide-gas absorber required for absorbing 1 mol of a carbon dioxide ($CO_2$) gas were about 386 g and about 83 mL, respectively.

This volume (about 83 mL) was calculated from the true specific gravity. If the porosity is about 40%, the amount (volume) of the carbon-dioxide-gas absorber required for absorbing 1 mol of a carbon dioxide ($CO_2$) gas is about 139 mL.

As described above, according to the inventive apparatus for separating a carbon dioxide gas, the first carbon-dioxide-gas absorber in the first preferred embodiment is brought into contact with an exhaust combustion gas including about 20 vol % carbon dioxide gas at about 700° C. and at normal pressure to absorb the carbon dioxide gas. The carbon-dioxide-gas absorber that has absorbed the carbon dioxide gas is heated to a predetermined temperature (about 850° C.) under reduced pressure (about 100 Pa) to evolve the carbon dioxide gas. Thus, the absorption of a carbon dioxide gas can be performed at high temperatures in the carbon-dioxide-gas-absorbing mechanical unit. The evolution of the absorbed carbon dioxide gas (regeneration of the carbon-dioxide-gas absorber) can be surely performed in the carbon-dioxide-gas-evolving mechanical unit. Therefore, the carbon dioxide gas can be stably, efficiently, and economically separated and recovered at high temperatures.

Furthermore, in the third preferred embodiment, the mechanical unit A and the mechanical unit B are preferably disposed substantially in parallel. The flow of the exhaust combustion gas is switched with the selector valve 10 such that the mechanical unit A and the mechanical unit B alternately function as the carbon-dioxide-gas-absorbing mechanical unit and the carbon-dioxide-gas-evolving mechanical unit. Alternatively, the carbon-dioxide-gas-absorbing mechanical unit and the carbon-dioxide-gas-evolving mechanical unit may have different structures and may each function as a single-purpose mechanical unit. That is, the carbon-dioxide-gas-absorbing mechanical unit only absorbs a carbon dioxide gas. The carbon-dioxide-gas-evolving mechanical unit only evolves a carbon dioxide gas. In this case, it is necessary to appropriately replace the carbon-dioxide-gas absorber with new one.

Fourth Preferred Embodiment $BaCO_3$ was added to a $BaTiO_3$ powder such that the molar ratio of $BaTiO_3$ to $BaCO_3$ is 1/1. Water was added thereto. The resulting mixture was mixed for about 2 hours with a ball mill.

The resulting mixture was dried at about 120° C. for about 10 hours. A binder was added thereto, and the mixture was granulated to form granulated spherical particles each having a size of about 2 mm to about 5 mm.

The granulated spherical particles were calcined at about 500° C. for about 2 hours and then fired at a predetermined temperature between about 1,000° C. and about 1,200° C. for about 2 hours to form a carbon-dioxide-gas absorber primarily including $Ba_2TiO_4$.

The specific surface area, the maximum amount of a carbon dioxide gas absorbed, and the state of the occurrence of a crack after the absorption of a carbon dioxide gas were examined for the resulting carbon-dioxide-gas absorber.

Table 3 shows the results.

TABLE 3

| sample | Siring temperature (° C.) | Specific surface area ($m^2/g$) | Maximum amount of carbon dioxide gas absorbed (maximum value of TG) (wt %) | Presence of occurrence of crack after absorption of carbon dioxide gas |
|---|---|---|---|---|
| 11 | 1000 | 0.53 | 10.5 | None |
| 12 | 1100 | 0.32 | 10.6 | None |
| 13 | 1150 | 0.16 | 6.9 | Observed (minute) |
| 14 | 1200 | 0.11 | 3.4 | Observed |

In Table 3, the specific surface area was measured by a BET method.

The maximum amount of the carbon dioxide gas absorbed was defined as the maximum value of TG in TG-DTA analysis that was performed at a heating rate of about 10° C./min and at a $CO_2$ concentration of about 20%.

The state of a crack after the absorption of the carbon dioxide-gas was determined by microscopic observation (×500) of the sample after absorption of the carbon dioxide gas.

As shown in Table 3, in the case of sample 11 (carbon-dioxide-gas absorber) fired at about 1,000° C. and the case of sample 12 (carbon-dioxide-gas absorber) fired at about 1,100° C., the specific surface areas were about 0.53 $m^2/g$ (sample 11) and about 0.32 $m^2/g$ (sample 12), which were greater than about 0.25 $m^2/g$. The maximum amounts of the carbon dioxide gas absorbed were about 10.5 percent by weight (sample 11) and about 10.6 percent by weight (sample 12), which were large. Furthermore, no occurrence of a crack was observed. Therefore, satisfactory results were obtained.

In contrast, in the case of sample 13 (carbon-dioxide-gas absorber) fired at about 1,150° C., the specific surface area was as small as about 0.16 $m^2/g$. The maximum amount of the carbon dioxide gas absorbed was as small as about 6.9 percent by weight. Furthermore, the occurrence of a minute crack was observed after the absorption of the carbon dioxide gas.

In the case of sample 14 (carbon-dioxide-gas absorber) fired at about 1,200° C., the specific surface area was as small as about 0.11 $m^2/g$. The maximum amount of the carbon dioxide gas absorbed was as small as about 3.4 percent by weight.

Furthermore, the occurrence of a crack was observed after the absorption of the carbon dioxide gas.

Figure 8:
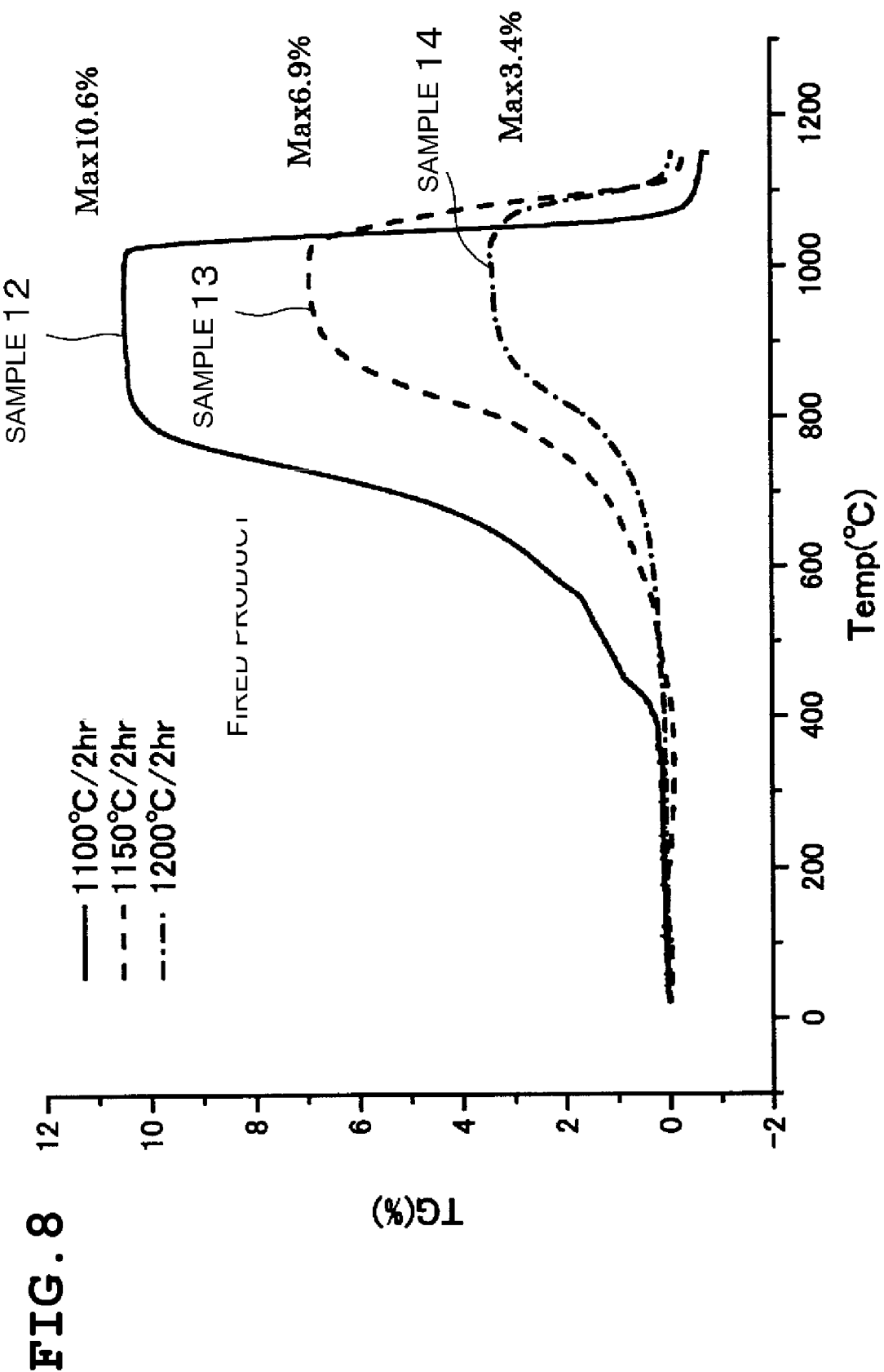
FIG. 8 shows a chart of the results of the TG-DTA analysis of samples 12, 13, and 14 fired at 1,100° C., 1,150° C., and 1,200° C., respectively, in a fourth preferred embodiment of the present invention.

FIG. 8 shows a chart of TG-DTA analysis of samples 12, 13, and 14 fired at about 1,100° C., about 1,150° C., and about 1,200° C., respectively.

FIG. 8 shows that in the case of sample 12 having a large specific surface area, the maximum amount of the carbon dioxide gas absorbed is large at temperatures between about 900° C. and about 1,000° C. In contrast, FIG. 8 shows that in the case of samples 13 and 14 each having a small specific surface area, the maximum amounts of the carbon dioxide gas absorbed are reduced at temperatures between about 900° C. and about 1,000° C. Thus, it is apparent that each of samples 13 and 14 (carbon-dioxide-gas absorbers) does not offer a sufficient amount of the carbon dioxide gas absorbed.

Fifth Preferred Embodiment

An unnecessary portion (unnecessary green sheet) obtained after the removal of a necessary portion from a green sheet primarily including a compound ($BaTiO_3$) including Ba and Ti at a molar ratio of Ba to Ti, i.e., (Ba/Ti), of about 0.99 to about 1.01 and having a perovskite structure as a main crystalline structure, the green sheet being used for the production of a multilayer ceramic capacitor, was calcined at about 500° C. to form a ceramic powder having a $BaTiO_3$ content of about 87%.

The remainder of the resulting ceramic powder primarily includes oxides of Ca, Zr, Si, and Na.

Similarly to the method for producing the first carbon-dioxide-gas absorber, $BaCO_3$ was added to the resulting ceramic powder such that the molar ratio of $BaTiO_3$ to $BaCO_3$ is 1/1. Water was added thereto. The resulting mixture was mixed for about 2 hours with a ball mill. The resulting mixture was dried at about 120° C. for about 10 hours. A binder was added thereto, and the mixture was granulated to form granulated spherical particles each having a size of about 2 mm to about 5 mm.

The resulting granulated particles were calcined at about 500° C. for about 2 hours and then fired at a predetermined temperature between about 1,000° C. and about 1,200° C. for about 2 hours to form a carbon-dioxide-gas absorber mainly composed of $Ba_2TiO_4$.

The specific surface area, the maximum amount of a carbon dioxide gas absorbed, and the state of the occurrence of a crack after the absorption of a carbon dioxide gas were examined for the resulting carbon-dioxide-gas absorber.

Table 4 shows the results.

TABLE 4

| sample | Siring temperature (° C.) | Amount charged in sagger (g) | Specific surface area ($m^2/g$) | Maximum amount of carbon dioxide gas absorbed (maximum value of TG) (wt %) | Presence of occurrence of crack after absorption of carbon dioxide gas |
|---|---|---|---|---|---|
| 21 | 1000 | 100 | 0.51 | 10.0 | None |
| 22 | 1050 | | 0.46 | 9.7 | None |
| 23 | 1100 | | 0.43 | 9.5 | None |
| 24 | 1150 | | 0.15 | 5.8 | Observed (minute) |
| 25 | 1200 | | 0.03 | 1.6 | None |
| 26 | 1000 | 200 | 0.83 | 9.9 | None |
| 27 | 1050 | | 0.61 | 9.5 | None |
| 28 | 1100 | | 0.31 | 9.4 | None |
| 29 | 1150 | | 0.22 | 8.5 | None |

The amount charged in a sagger shown in Table 4 refers to the amount of the granulated particles charged in the sagger for heat treatment and used during firing.

In Table 4, the specific surface area, the maximum amount of the carbon dioxide gas absorbed, and the state of a crack after the absorption of the carbon dioxide gas were measured or observed as in Table 3.

Table 4 shows that in the case of the firing temperature is about 1,150° C. or greater (samples 24, 25, and 29), the specific surface area is reduced, and the maximum amount of the carbon dioxide gas is reduced, as in the fourth preferred embodiment.

Among samples 24, 25, and 29 each having the reduced maximum amount of the carbon dioxide gas absorbed, for samples 24 and 25 each having an amount charged in the sagger of about 100 g, the occurrence of cracks was observed on the surfaces of samples after the absorption of the carbon dioxide gas.

Among samples 24, 25, and 29 each having the reduced maximum amount of the carbon dioxide gas absorbed, for sample 29 having an amount charged in the sagger of about 200 g, the specific surface area is increased as compared to samples 24 and 25. This may be because the concentration of the carbon dioxide gas in a firing atmosphere was increased.

Table 4 shows that in the case of a firing temperature of about 1,100° C. to about 1,100° C., for each of the resulting carbon-dioxide-gas absorbers (that is, samples 21, 22, 23, 26, 27, and 28 (carbon-dioxide-gas absorbers)) regardless of the amount charged, the specific surface area and the maximum amount of the carbon dioxide gas absorbed are relatively large, and no occurrence of cracks is observed after the absorption of the carbon dioxide gas. Therefore, the carbon-dioxide-gas absorbers have the properties required as carbon-dioxide-gas absorbers.

Figure 9:
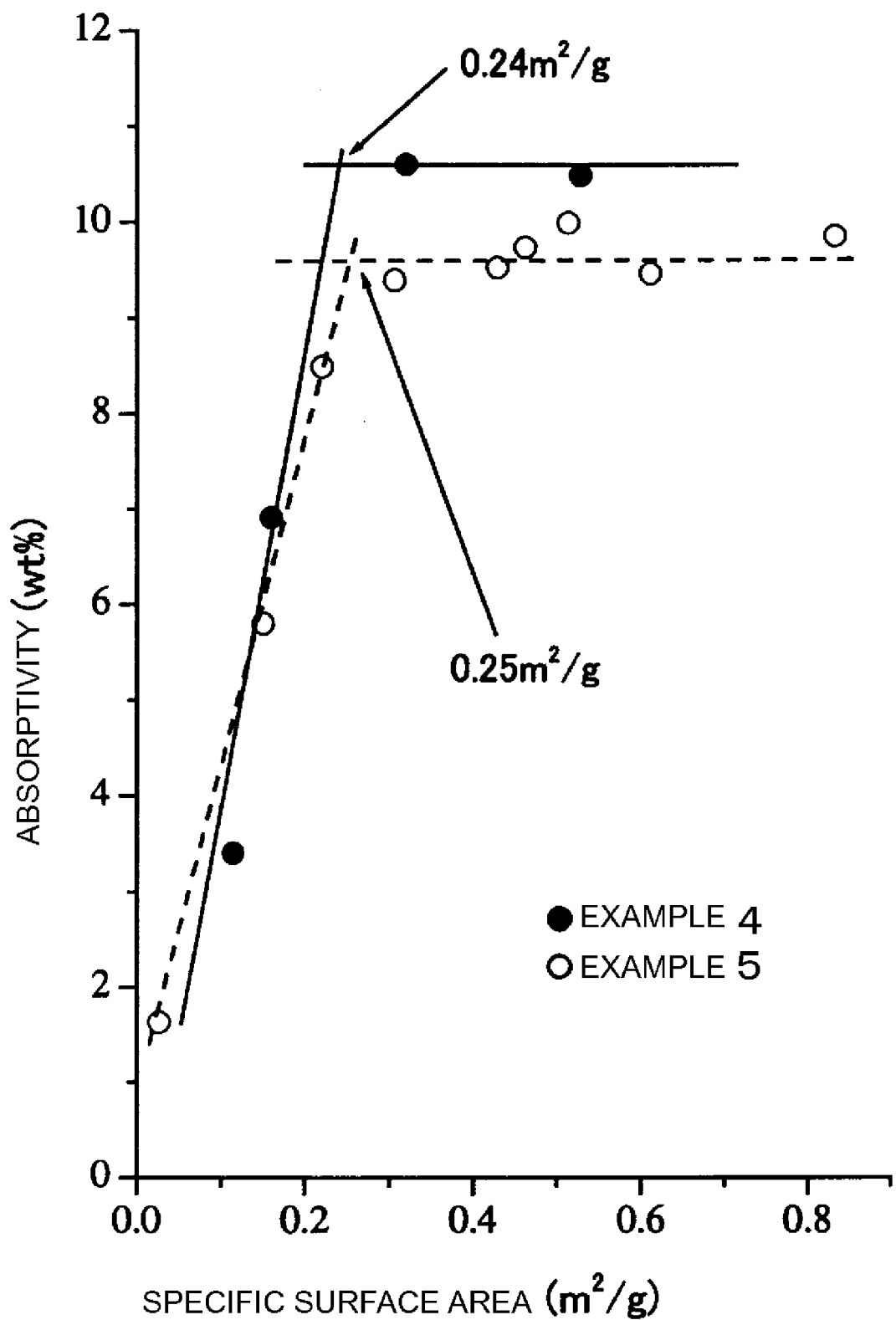
FIG. 9 is a graph showing the relationship between the maximum amount of a carbon dioxide gas absorbed and the specific surface area of a carbon-dioxide-gas absorber obtained in EXAMPLE 4 and the relationship between the maximum amount of a carbon dioxide gas absorbed and the specific surface area of a carbon-dioxide-gas absorber obtained in a fifth preferred embodiment of the present invention.

Relationship between Specific Surface Area and Maximum Amount of Carbon Dioxide Gas Absorbed FIG. 9 is a graph showing the relationship between the maximum amount of a carbon dioxide gas absorbed and the specific surface area of a carbon-dioxide-gas absorber obtained in the fourth preferred embodiment and the relationship between the maximum amount of a carbon dioxide gas absorbed and the specific surface area of a carbon-dioxide-gas absorber obtained in the fifth preferred embodiment.

As shown in FIG. 9, in the case of the carbon-dioxide-gas absorber according to the fifth preferred embodiment, the maximum amount absorbed is small as compared to that of the carbon-dioxide-gas absorber according to the fourth preferred embodiment. This is because with the carbon-dioxide-gas absorber according to the fifth preferred embodiment, the $Ba_2TiO_4$ content is reduced due to impurities in the sample (starting material) as compared to that of the carbon-dioxide-gas absorber in third fourth preferred embodiment.

In any of the carbon-dioxide-gas absorbers in the fourth and fifth preferred embodiments, a specific surface area of less than about 0.25 $m^2/g$ reduces the maximum amount of the carbon dioxide gas absorbed. Thus, the specific surface area is preferably at least about 0.25 $m^2/g$.

Sixth Preferred Embodiment

Into a vessel made of stainless steel, having an inner diameter of about 22 mm, having a length of about 300 mm, and having a electric heater disposed at the outside, about 22 g (about 10 mL) of a carbon-dioxide-gas absorber ($Ba_2TiO_4$) having an average particle size of about 2 mm and corresponding to the carbon-dioxide-gas absorber in the first preferred embodiment was charged. A nitrogen gas was passed at a rate of about 19 NL/h. The temperature of an inlet for the nitrogen gas was heated at about 750° C. with the electric heater.

After the temperature of the nitrogen gas passed was stabilized, a carbon dioxide gas including about 100 ppm sulfur dioxide was passed at a rate of about 1 NL/h (the concentration of the carbon dioxide gas: about 5 mol %), and the absorption of the carbon dioxide gas was performed. The concentration of sulfur dioxide in the gas emitted from the carbon-dioxide-gas-absorbing apparatus was approximately 0 ppm during the operation of absorbing the carbon dioxide gas.

Seventh Preferred Embodiment

The operation of absorbing a carbon dioxide gas was performed while a carbon dioxide gas including 100 ppm sulfur dioxide was passed as in the sixth preferred embodiment, except that the temperature of the inlet for the nitrogen gas was controlled to about 900° C. The concentration of sulfur dioxide in the gas emitted from the carbon-dioxide-gas-absorbing apparatus was approximately 0 ppm during the operation of absorbing the carbon dioxide gas.

The results of sixth and seventh preferred embodiments demonstrated that the absorber eliminated the sulfur oxide gas from the gas while the absorber absorbed the carbon dioxide gas.

Eighth Preferred Embodiment

Into a vessel made of stainless steel, having an inner diameter of about 22 mm, having a length of about 300 mm, and having a electric heater disposed at the outside, about 22 g (about 10 mL) of a carbon-dioxide-gas absorber ($Ba_2TiO_4$) having an average particle size of about 2 mm and corresponding to the first carbon-dioxide-gas absorber in the first preferred embodiment was charged. A nitrogen gas was passed at a rate of 19 NL/h. The temperature of an inlet for the nitrogen gas was heated at about 750° C. with the electric heater.

After the temperature of the nitrogen gas passed was stabilized, a carbon dioxide gas including about 120 ppm nitrogen oxide (nitrogen monoxide/nitrogen dioxide=1/1) was passed at a rate of about 1 NL/h (the concentration of the carbon dioxide gas: about 5 mol %), and the absorption of the carbon dioxide gas was performed. The concentration of nitrogen oxide in the gas emitted from the carbon-dioxide-gas-absorbing apparatus was about 70 ppm.

The results of the eighth preferred embodiment demonstrated that the absorber eliminated the nitrogen oxide gas from the gas while the absorber absorbed the carbon dioxide gas.

The present invention is not limited to the above-described preferred embodiments. With respect to the ratio of Ti to the constituent X that is at least one of Sr and Ba in the carbon-dioxide-gas absorber, absorption and evolution conditions of the carbon dioxide gas, specific structures of the carbon-dioxide-gas-absorbing mechanical unit and the carbon-dioxide-gas-evolving mechanical unit defining the apparatus for separating a carbon dioxide gas, various applications and modifications may be made within the scope of the invention.

A carbon-dioxide-gas absorber according to various preferred embodiments of the present invention preferably includes a composite oxide as a main component, the composite oxide including Ti and a constituent X that is at least one of Sr and Ba, the composite oxide having an (X/Ti) of about 1.8 to about 2.2 on a molar basis. The absorber can absorb a carbon dioxide gas at a temperature of at least about 500° C. and can efficiently evolve the absorbed carbon dioxide gas at a pressure of about 1,000 Pa or less and a temperature of at least about 750° C. Thus, the absorption, separation, and recovery of the carbon dioxide gas with the carbon-dioxide-gas absorber results in the economic, efficient separation and recovery of the carbon dioxide gas at high temperatures. Furthermore, a high-concentration carbon dioxide gas can be recovered by evolution (desorption) of the carbon dioxide gas at a reduced pressure of about 1,000 Pa or less. A compound in which the constituent X defining the carbon-dioxide-gas absorber is partially replaced with a predetermined amount of Ca is also useful as a carbon-dioxide-gas absorber.

Therefore, the present invention can be widely applied to the separation of the carbon dioxide gas from a gas containing carbon dioxide gas, for example, the elimination of the carbon dioxide gas from exhaust combustion gases emitted from factories or the elimination of the carbon dioxide gas from exhaust gases emitted from engines of automobiles.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A carbon-dioxide-gas absorber comprising:
   a composite oxide as a main component; wherein
   the composite oxide includes Ti and a constituent X that is at least one of Sr and Ba;
   the composite oxide has a molar ratio of X to Ti, X/Ti, of about 1.8 to about 2.2; and
   Ti is partially replaced with Zr, and a molar ratio of Zr to Ti, Zr/Ti, is about 0.25 or less.

2. The carbon-dioxide-gas absorber according to claim 1, wherein the constituent X is partially replaced with Ca and has a molar ratio of Ca to X, Ca/X, of about 1.0 or less.

3. The carbon-dioxide-gas absorber according to claim 1, wherein the carbon-dioxide-gas absorber has a specific surface area of at least about 0.25 $m^2/g$.

4. A method of manufacturing a carbon-dioxide-gas absorber comprising the steps of:
   firing a substance including Ti and a constituent X that is at least one of Sr and Ba in the presence of at least one of strontium carbonate and barium carbonate; and
   selecting the substrate such that a molar ratio of X to Ti, X/Ti, of the substrate in the range of about 0.9 to about 1.1 and having a perovskite structure as a main crystalline structure; wherein
   the constituent X is partially replaced with Ca and has a molar ratio of Ca to X, Ca/X, of about 1.0 or less.

5. The method of manufacturing a carbon-dioxide-gas absorber according to claim 4, wherein the carbon-dioxide-gas absorber is prepared by firing the substance containing Ca, Ti and the constituent X that is at least one of Sr and Ba in the presence of at least one of calcium carbonate, strontium carbonate, and barium carbonate, the substance having a perovskite structure as a main crystalline structure.

6. The method of manufacturing a carbon-dioxide-gas absorber according to claim 4, wherein Ti is partially replaced with Zr, and a molar ratio of Zr to Ti, Zr/Ti, is about 0.25 or less.

7. The method of manufacturing a carbon-dioxide-gas absorber according to claim 4, wherein the carbon-dioxide-gas absorber has a specific surface area of at least about 0.25 $m^2/g$.

8. The method of manufacturing a carbon-dioxide-gas absorber according to claim 4, wherein the carbon-dioxide-gas absorber is in the form of pellets and is prepared by forming green pellets and then firing the green pellets at about 1,000° C. to about 1,100° C.

9. A method for separating a carbon dioxide gas comprising the steps of:
   providing a carbon-dioxide-gas absorber including a composite oxide as a main component, wherein the composite oxide includes Ti and a constituent X that is at least one of Sr and Ba, and the composite oxide has a molar ratio of X to Ti, X/Ti, of about 1.8 to about 2.2;
   absorbing a carbon dioxide gas at a pressure of about $1.0 \times 10^4$ to about $1.0 \times 10^6$ Pa and at a temperature of about 500° C. to about 900° C.; and
   evolving a carbon dioxide gas absorbed in the carbon-dioxide-gas absorber at a pressure of about 1,000 Pa or less and at a temperature of at least about 750° C.

* * * * *